UNITED STATES PATENT OFFICE.

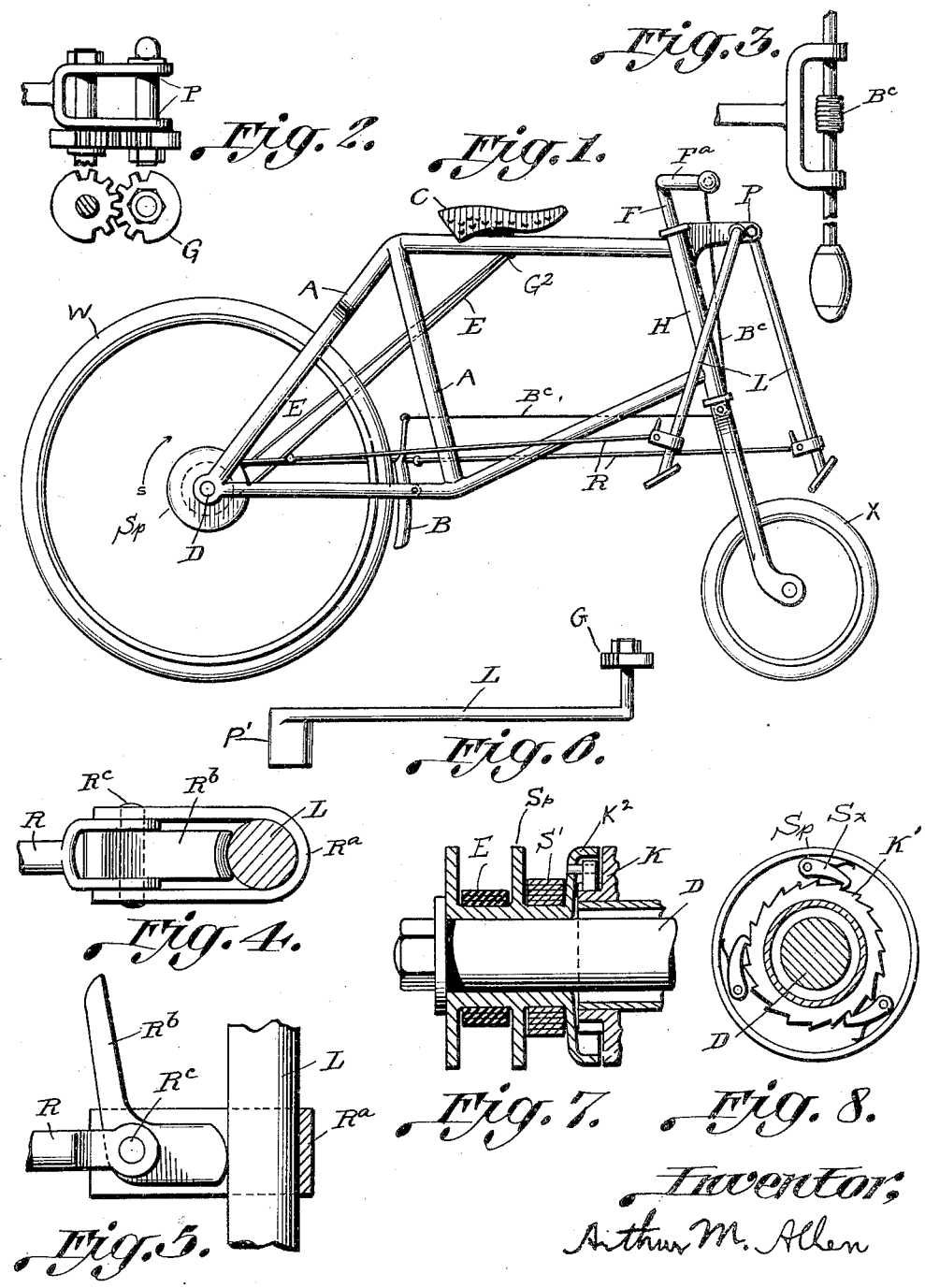

ARTHUR MOFFAT ALLEN, OF NEW BRIGHTON, NEW YORK.

MULTIPLE-GEARED VELOCIPEDE.

1,397,068.   Specification of Letters Patent.   Patented Nov. 15, 1921.

Application filed September 30, 1918. Serial No. 256,361.

*To all whom it may concern:*

Be it known that I, ARTHUR MOFFAT ALLEN, a citizen of the United States, residing at New Brighton, county of Richmond, and State of New York, have invented certain new and useful Improvements in Multiple-Geared Velocipedes, fully described and represented in the following specification and the accompanying drawings, forming a part of the same.

The present invention relates to improvements in the driving-gear of wheeled vehicles, and it consists of a combination of foot-levers pivoted upon the front end of the frame to be oscillated by the operator, clutches applied to opposite ends of the hub of the road wheel which propels the vehicle, and connections between the pedals and such clutches to make them alternately impel the road wheel.

The connections from the clutches are joined adjustably to the foot-levers, so that the leverage of the foot pedals upon such connections may be varied.

The oscillations of the foot-levers would be the same in any case, but the closer that the joined connections are adjusted in relation of the pivots of the foot-levers the less will be the movement of the clutch connection, and the slower the road wheel will be revolved.

Such slow speed is accompanied by a greater increase of force and the vehicle can thus obviously be propelled up hill with greater ease, and propelled more rapidly when riding upon a level.

The invention includes various constructive features which are described herein and specifically pointed out in the claims.

In the drawing, Figure 1 is a side elevation of a velocipede provided with the improvements; Fig. 2 is a plan of the extension from the front of the frame with the gearing connecting the pivoted ends of the foot-levers; Fig. 3 is a plan of the handle-bar with means for operating the brake; Fig. 4 is a cross section of one of the foot-levers with one of the hinge joints of the clutch connection in plan; Fig. 5 is a side elevation of the same parts with the nearer half of the yoke broken away which carries the hinge; Fig. 6 is an edge view of one of the pedal-levers; Fig. 7 shows one end of the road wheel spindle with one end of the wheel-hub, and the clutch and its driving pulley in section; and Fig. 8 is an elevation of the clutch, and the ratchet wheel secured upon the hub.

The improvements are shown applied to a velocipede, the rear or road wheel W being journaled on spindle D in the rear end of the frame as usual, and the steering-wheel X journaled in the usual fork having a post F fitted to a steering-head H and provided with handle-bar $F^a$.

An extension P is projected forwardly from the top of the steering head and is furnished with adjacent bearings for journals formed upon the top ends of the foot-levers L, as shown in Fig. 6. The journals are furnished with intermeshing gears G which cause the foot-levers to oscillate in opposite directions when impelled by the feet.

To rotate the road-wheel W by connections to the foot-levers, a hub K is projected from each side of the road-wheel, one end of the hub being shown in Figs. 7 and 8, and such hub is shown provided with a series of ratchet-teeth $K'$.

Upon the spindle D next to each end of the hub, a clutch plate $K^2$ carrying pawls $S^x$ is shaped to form two pulleys $S^p$ turning loosely upon the spindle, a strap $S'$ being wound upon one of the pulleys and a strap E being wound in a reverse direction upon the other pulley. Each strap $S'$ is connected by a rod R to a joint-pin $R^c$, which can be secured adjustably upon the foot-lever, by a clamping-yoke $R^a$ and a cam $R^b$.

Elastic straps E connect the two pulleys $S^p$ to the frame at $G^2$, each end being fastened to one pulley $S^p$, thus securing alternate action.

During the forward or working movement of the foot-levers, the pawls engage the teeth of the ratchet $K'$ and the strap $S'$ rotates the road wheel in the direction of the arrow *s* in Fig. 1.

During such working movement of one of the foot-levers the other is moving backwardly and its clutch-pawls are ready to re-engage the clutch upon the opposite end of the hub as soon as the oscillation of the foot-lever is reversed.

It is evident that a maximum movement or rotation of the road wheel is effected when the yokes $R^a$ are attached to the foot-levers near their lower ends, as shown in Fig. 1, whereas a mimimum movement of the wheel is effected for each movement of the foot-levers if the yokes R^a be moved as close as possible to the lever-fulcrum in the extension P.

What I claim as new and desire to secure by Letters Patent is:

1. In a wheeled vehicle, the combination, with a suitable frame, of a stationary spindle mounted in the rear part of the frame, a road wheel fitted to turn loosely thereon and having a hub projecting from each side, a clutch operating upon each of the said hubs and constructed to automatically engage the hub when turned forwardly, a steering wheel with post journaled in a steering head upon the front of the frame, foot-levers having their upper ends journaled upon the forward part of the frame and their lower ends provided with foot-pedals, and a connection extended from each of the levers to one of the said clutches, the levers being operated alternately to impel the road-wheel forwardly.

2. A construction such as described in claim 1 with gearing connecting the levers at their pivots and operating to move them simultaneously in opposite directions.

3. A construction such as described in claim 2, the forward ends of the connections to the clutches being hinged adjustably to the levers to vary the leverage of the foot-levers upon said connections.

4. A construction such as described in claim 2, with means operating automatically to reverse the rotation of the clutches during the reversing motion of the foot-lever.

5. A construction such as described in claim 2, each of the clutches having adjacent pulleys attached thereto turning loosely upon the wheel spindle, and straps wrapped reversely about the said pulleys and connected respectively to the foot-levers and to elastic means for reversing the clutches, whereby the clutch is automatically turned backwardly during the reversing motion of the foot-levers.

Signed at New Brighton in the county of Richmond and State of New York this 28th day of September A. D. 1918.

ARTHUR MOFFAT ALLEN.

Witnesses:
ANDREW MEYER,
JOSEPH G. UTTER.